United States Patent [19]

Lohr, Jr. et al.

[11] 4,035,314

[45] July 12, 1977

[54] RECOVERY OF POLYURETHANE PREPOLYMER AND AMINE SALT

[75] Inventors: Delmar Frederick Lohr, Jr.; Edward Leo Kay, both of Akron, Ohio

[73] Assignee: The Firestone Tire & Rubber Company, Akron, Ohio

[21] Appl. No.: 583,077

[22] Filed: June 2, 1975

[51] Int. Cl.$^2$ .................................. C08J 11/04
[52] U.S. Cl. .................. 260/2.3; 260/77.5 AA; 260/77.5 A; 260/567.6 R
[58] Field of Search ....... 260/2.3, 77.5 A, 77.5 AA, 260/2.5 BD

[56] References Cited

U.S. PATENT DOCUMENTS 3,738,946  6/1973  Frulla et al. .................. 260/2.3

FOREIGN PATENT DOCUMENTS 2,207,379  8/1973  Germany

OTHER PUBLICATIONS

Mahoney et al., Environmental Science and Technology, vol. 8, No. 2, Feb. 1974, pp. 135-139.
Strassel et al., Chemical Abstracts, vol. 69:52,748u (1968).
Roberts et al., An Introduction to Modern Experimental Organic Chemistry, Holt, Rinehart and Winston, Inc., N.Y. (1969) pp. 328-333.
Morrison et al., Organic Chemistry, Allyn and Bacon, Inc., Boston (1959) pp. 521, 522.
Adams et al., Laboratory Experiments in Organic Chemistry, Fifth Edition, The MacMillan Co., N.Y. (1963) pp. 105-108.
Brescia, et al., Fundamentals of Chemistry a Modern Introduction, Academic Press, N.Y. (1966) 1st Edition pp. 534-535.

Primary Examiner—Howard E. Schain
Assistant Examiner—W. C. Danison, Jr.

[57] ABSTRACT

It is known that polyurethane hydrolyzes in superheated steam.

The oily hydrolyzate from a polyurethane derived from a polyether diol is filtered and stripped to remove the water and remove any unhydrolyzed water-insoluble polymer such as vulcanized rubber, etc. that may be present. There may be a substantial amount of scrap rubber present in the scrap polyurethane that is treated, such as the scrap from a plant producing rubber and plastic products, or scrap articles that may include rubber and polyurethane, such as mats, cushions, automobile parts, solid and pneumatic tires, etc., or scrap which contains old rubber and polyurethane products such as an accullation of scrap rubber tires and polyurethane tires, etc.

The oil produced by the hydrolysis which is essentially a polyether diol (the polyether is nominally difunctional with regard to hydroxyl groups, but may contain minor amounts of material with greater than two functionally) or a mixture of such diols is dissolved in a solvent and the solution is gassed with hydrochloric acid gas which causes amine hydrochloride salts to form, the amine being derived from the amine-cured polyurethane polymer. If precipitate is formed it is removed, as by centrifuging, and excess hydrochloric acid is suitably removed. If the polyurethane has been plasticized with oil, or there is oil present in the rubber (if rubber is present) the oil is dissolved in the polyether diol recovered from the polyurethane. The plasticizer oil may be separated from the polyether diol, as by distillation, or polyether diol/plasticizer mixture may be used, with or without purification, in the production of further polyurethane.

2 Claims, 1 Drawing Figure

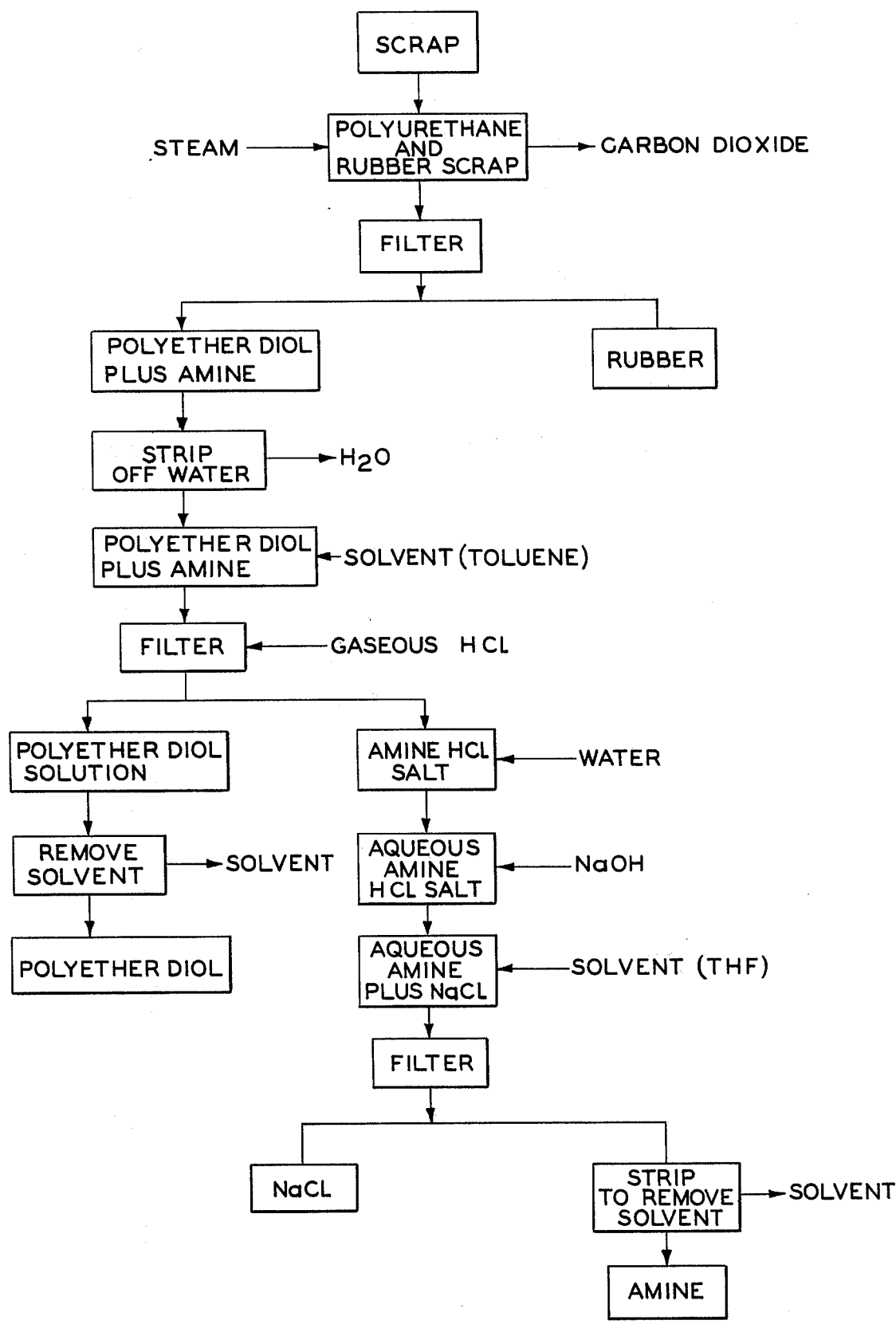

RECOVERY OF POLYURETHANE PREPOLYMER AND AMINE SALT

PRIOR ART

HYDROLYSIS OF POLYURETHANE FOAM WASTE by Mahoney et al., Vol. 8, No. 2 of ENVIRONMENTAL SCIENCE AND TECHNOLOGY for February 1974, pages 135–139 describes reacting polyurethane foam (derived from a polyether and toluene diisocyante and cured with methylene bis-ortho-chloroaniline or other diamine) for 15 minutes with superheated water at 200° C. and obtaining toluene diamines and polypropylene oxide. The resulting oil and water phases are separated to recover these products.

German Pat. No. 2,207,379 describes heating waste polyether urethane with steam. The resulting mass is dissolved in toluene or other organic solvent, and then treated with 5 per-cent hydrochloric acid so that the polyether can be separated by decantation. However, experimentation by applicants has shown that an emulsion is formed which cannot be readily separated by decantation, so the process is relatively difficult and expensive to practice. In addition, the amine hydrochloride salts are only relatively soluble in water and a relatively large volume of dilute hydrochloric acid is required for efficient separation thus adding to the cost of the process by requiring a larger reactor as well as a relatively long time for complete separation of phases.

The basic chemistry of hydrolyzing polyurethanes is well known and is illustrated by the following chemical equations:

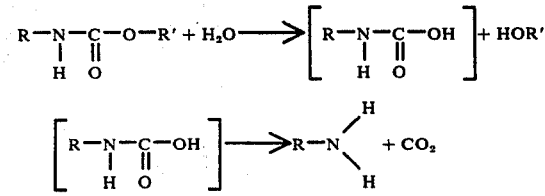

in which R represents an amine moiety and R ' represents a polyether diol moiety.

Although the basic chemistry is well known, the application of the chemistry to practical problems such as recovering polyurethane components from conventional rubber/polyurethane is receiving considerable interest in industrial applications. The separation of the conventional rubber and polyurethane components can be effected by physical means but this is an expensive procedure. From a practical standpoint, it was desired to effect the separation of conventional rubber and polyurethane in an economical and an efficient manner. Physical separation of the components is both expensive and time consuming. In addition, the probability of incomplete separation of the components by physical means is relatively high leading to contamination of products derived from the separated components.

The preceding are economic reasons for discovering a reliable, inexpensive procedure for separating and recovering the components of conventional rubber/polyurethane mixtures, composites or laminations.

An added difficulty is that there is a distinct possibility of contamination of the separated components by conventional compounds used in the preparation of the conventional rubber, polyurethane or the adhesive used in the preparation of laminations. For example, conventional rubber is typically prepared by using vulcanization accelerators, antioxidants and antiozonants some of which are relatively soluble in both water and organic solvents. Thus the desired process must prevent cross contamination of recovered products. In addition complete separation of the components must be effected. For example, a polyether diol fraction may contain other materials which are not reactive to isocyanates but must not contain polar materials such as amines, alcohols etc. which are reactive with isocyanates. These restrictions are necessary if the recovered polyether diol is to be advantageously recycled to prepare a polyurethane of good quality. The realization of the previous state or implied objectives were realized by our process which is further defined in what follows.

SUMMARY OF THE INVENTION

Scrap polyurethane which is made from polyether diols is hydrolyzed in steam, as is known in the art and the resulting polyether diol and amine are separated.

It has been found that if the polyurethane scrap contains scrap rubber (any hydrocarbon rubber that is composed of repeating conjugated diene units, such as natural rubber, polybutadiene, polyisoprene, copolymer of butadiene and isoprene, copolymer of styrene or other vinyl monomer and butadiene and/or isoprene), the rubber is not hydrolyzed and extraction of polar fractions is held at a sufficiently low lever as to prevent cross contamination. The hydrocarbon rubber is readily separated from the hydrolyzed polyurethane by filtration. (Other separating means such as decantation, centrifuging, etc. may be used but are not as attractive commercially as filtering.)

The process finds particular application in the treatment of rubber/polyurethane laminations. For example, pneumatic tires containing a polyurethane body and conventional rubber tread or a conventional rubber body and polyurethane tread can be treated to recover the conventional rubber and the majority of the components of the polyurethane.

Although rubber, if present, does not hydrolyze, it contains antioxidants, accelerator fragments, curing agent and oils which can be extracted by steam and by the hydrolyzed liquid polyether diol and amines. Such extracted materials could interfere with the subsequent reactions in which the recovered polyether diol is formed into prepolymer and cured to form polyurethane. It was a completely unexpected result of the hydrolysis, that the recovered polyether diol could be formed into prepolymer without purification after separation from the hydrolyzate mixture. The fact that any plasticizers that may have been present in the treated polyurethane do not have to be separated from the recovered polyether diol before it is used in prepolymer formation is very advantageous commercially. This is very different from the finding of Mahoney et al. supra, who on page 138 state that the recovered polyether has to be purified by decolorizing and drying before any recycling would be possible.

Also, it is found that if the hydrolyzed mass after separation of rubber, if present, is dissolved in toluene or other suitable solvent, and the resulting solution which contains the polyether diol is gassed with hydrochloric acid gas, the amine hydrochloride salt which is produced is readily removed as by ion exchange or separation by centrifuging, filtering or other commercial means.

Any small amount of excess hydrochloric acid may be removed from the diol fraction by treatment with sodium carbonate or other basic solid material, or the diol fraction can be heated to drive off the volatile hydrogen chloride gas.

If the filtrate contains plasticizer oil, this may be separated by distillation or other suitable procedure.

It it well known that polyether urethane prepolymers may be obtained by diisocyanate reaction of a polyether diol, and then cured with any diol or glycol or diamine such as methylene bis-ortho-chloroaniline (MOCA) or 4,4'-methylene-dianiline, etc.

The polyether prepolymers usually employed commerically are Adiprenes, including Adiprene LD-784 used heren, which is prepared by reacting polytetrahydrofuran diol (about 1300 molecular weight) with toluene diisocyanate. Another prepolymer that may be used is the reaction product of polypropylene oxide polyol and a diisocyanate, such as toluene diisocyanate, etc. Such prepolymers may be used alone or in combination with other polyether prepolymers.

In the steam treatment, superheated steam is used, usually at a temperature of 175°to 300°C. or more. The hydrolyzed mass is usually cooled, at least somewhat, before the rubber (if present) is separated, and this is usually done between 75° C. and room temperature. No solvent is present at this stage except a small quantity of tetrahydrofuran or other solvent used to dissolve antioxidant that may be added if desired. The water is stripped off and the residual mass of hydrolyzed polyurethane is dissolved in an aromatic solvent.

The dissolution is conveniently done with toluene, although other aromatic solvents may be used, including benzene, xylene, chlorobenzene, etc.

The accompanying flow sheet illustrates the general procedure. If no rubber is present, the oily mass obtained by steam hydrolysis may be filtered to remove insoluble impurities, including metal parts, fabric, etc. which may accompany scrap polyurethane obtained by stripping old automobiles, although filtration is not necessary if the polyurethane is sufficiently clean.

The following example is illustrative. It starts with the hydrolyzed mass, which if no rubber is present, may be produced by a procedure old in the art. The procedure is the same if rubber is present, except that the rubber which is not hydrolyzed is present as insoluble chunks in the hydrolyzed mass, and is removed by filtering or centrifuging or other suitable procedure. This removal of rubber is an important feature of the invention because it makes a most practical procedure, as the scrap may contain rubber as an impurity either as a polyurethane/hydrocarbon rubber laminate or separate pieces of hydrocarbon rubber.

The scrap is first shredded or otherwise cut into small pieces which may vary in weight. This scrap which may contain hydrocarbon rubber chunks or laminates in any amount from a very small amount up to an amount which weighs as much as the polyurethane, or more, is subjected to superheated steam. Carbon dioxide is given off during the steam treatment. The length of time of the steam treatment, and the amount of steam utilized will depend upon the temperature of the steam and the efficiency of the apparatus.

If is desirable to filter the hydrolyzed mass, and of course it is essential to filter or otherwise remove insoluble matter if rubber is present. The solution is then stripped to remove water.

EXAMPLE I

Twelve hundred (1200) grams of a solid polyurethane (produced from polytetrahydrofuran diol reacted with toluene diisocyanate and cured with 4,4'-methylenedianiline) was heated under nitrogen to 200° C. in saturated steam at 225 psig., and held at this temperature for 12 hours, during which time the pressure reached 550 psig. The reactor was gradually cooled to 75°C., and the hydrolyzed mass was removed into a vessel containing 100 ml. of tetrahydrofuran (THF) which contained 1 gram of 2,6-di-tert.butyl p-cresol (DBPC). The amount of solvent used was not critical. The THF was present only as solvent for the DBPC. Most any other usual rubber antioxidant could be used. (THF is water miscible and a good solvent for most antioxidants.) The foregoing amounts and conditions can readily be changed to provide an efficient commercial operating procedure.

The product consisted of two incompletely separated phases, both of which were red-brown. The water and THF were stripped off under vacuum leaving a red-brown oil which was kept under vacuum or nitrogen. If exposed to air it darkened appreciably. After several days a dark solid separated which was determined to be sodium chloride and tarry material which were separated. Such standing and separation are optional.

The oil was separated and 1,149 grams was dissolved in 1,200 ml. of toluene. Other aromatic solvents which might be used include benzene, xylenes, chlorobenzene, etc. The solution was gassed with HC1 as long as amine HC1 salt continued to be precipitated. The salt was separated by filtering through Celite for fast filtration, although any means of separating the salt might be used. The filtrate was almost colorless. The solvent was striped off under reduced pressure. A total of 624 grams (76 per cent yield based on unhydrolyzed polymer) of a strawcolored oil was obtained as the residue. This oil consisted of approximately 79 per cent polytetramethylene ether glycol (poly-THF diol), 21 per cent bis (2-ethylhexyl)-phthalate (DOP) and trace amounts of 2,4- and 2,6-toluene diamines and 4,4'-methylenedianiline. The polyether diol was produced by the hydrolysis of Adiprene LD-784 used in preparation of the polyurethane.

The amine hydrochloride salts may be isolated and by treatment pure amine is recovered which may be used in the production of further polyurethane.

Mixed diamines recovered in this manner may be (separated or otherwise treated and) reused in the preparation of polyurethane.

The results of a number of such hydrolyses are presented in Table I. As indicated, several results were obtained by dividing the complete hydrolysis mixture identified as Samples F, G, H, I, and J into several portions and treating them separately to recover the components. All runs were made with a scrap-to-water ratio of 1:1, and heated to 200° C. unless otherwise noted.

Comparison of the molecular weight of the recovered polyether diol with that of the control indicates that the polyurethane has been completely hydrolyzed and that the polyether diol has not been degraded in molecular weight. The meq. OH/g analysis is a measure of the hydroxyl functionality of the polyether diol. The theoretical value of a 79/21 mixture of polyether diol of $M_n=1300$ and DOP is 1.54. It will be noted that the values of the recovered polyether diol/DOP mixtures are quite close to this theoretical value indicating that the hydroxyl functionality of the recovered polyether is unchanged. The meq. $NH_2/g$ analysis is a measure of the amine content of the polyether diol/DOP mixture. The very low values obtained show that our process is very efficient in the removal of amines which would interfere with subsequent recycling of the recovered polyether diol. The recovered polyether diol/DOP mixture could be reacted with a diisocyanate to form a prepolymer. Any amines present in the mixture would react with the diisocyanate to form undesirable ureas. The recycling of the recovered polyether diol/ DOP mixture is described in Example 2 below.

TABLE I

| Runs | Reaction Time, hrs. | Poly THF diol/ DOP Analysis meq OH/g | meq $NH_2/g$ | Mn | Mw | Poly-THF/ DOP | Yields[1] TDA | MDA |
|---|---|---|---|---|---|---|---|---|
| A | 24 | 1.31 | 0.091 | | | 93 | NI | NI |
| B | 24 | 1.28 | 0.05 | | | 70[2] | NI | NI |
| C | 22 | | | 1170 | 1390 | 70 | | |
| D[3] | 24 | 1.39 | 0.006 | | | 77 | 68 | NI |
| E | 12 | 1.50 | 0.033 | | | 84 | 70 | NI |
| F-1 | 12 | 1.46 | 0.026 | | | 69 | | NI |
| F-2 | — | — | — | 1690 | 2070 | 80 | 46 | NI |
| F-3 | | 1.46 | 0.014 | | | 84 | | NI |
| F-4 | | 1.43 | 0.020 | | | 71 | NI | NI |
| F | | 1.48 | 0.031 | | | 78 | NI | NI |
| G-1[4] | | | | | | | | |
| G-2 | | 1.43 | 0.017 | | | 77 | | |
| G-3 | | | | | | | 51 | 38 |
| G-4 | | 1.49 | 0.008 | 1300 | 1720 | | | |
| G-5 | | 1.54 | 0.025 | | | | | |
| H-1 | 13 | 1.51 | 0.017 | | | | | |
| H-2 | | 1.53 | 0.015 | | | | | |
| H-3 | | 1.60 | 0.020 | | | | | |
| H-4 | | 1.56 | 0.023 | | | | | |
| H-5 | | 1.52 | 0.001 | 1200 | 1590 | 84 | 50 | 76[5] |
| I-1 | 12 | 1.15 | — | | | 82 | | |
| I-2 | | 1.55 | 0.028 | | | 78 | | |
| I-3 | | 1.51 | 0.019 | | | 80 | 85 | 65 |
| I-4 | | 1.49 | 0.029 | | | 80 | | |
| I-5 | | 1.34 | 0.012 | 1300 | 1700 | 69 | | |
| U-1[6] | | 1.59 | 0.046 | | | 86 | NI | NI |
| J-2 | | 0.94[7] | 0.013 | | | 65[7] | NI | NI |
| J-3 | | | 0.002 | 1250 | 1630 | 81 | NI | NI |
| K[8] | | 1.41 | 0.012 | 1310 | 1730 | 73 | NI | NI |
| Control | | | | 1300 | 1600 | — | — | — |

[1]Yields based on (1) PolyTHF diol + DOP; (2) TDA = Toluene Diamines; (3) 4,4'-methylene dianiline.
[2]After chromatography.
[3]Run was heated at 175° C.
[4]Run was heated 5 hrs. at 175° C. plus 10.5 hours at 200° C.
[5]As crude hydrochloride salt.
[6]Run was heated 3.5 hours at 175° C. plus 19 hours at 200° C.
[7]Treated with acidic alumina to remove color; evidently some of the more polar lower m. wt. material was absorbed.
[8]Charge was 8 scrap to 5 water.
NI = Not isolated.

EXAMPLE 2

A scrap lamination mixture of rubber and polyurethane derived from poly-THF diol reacted with Hylene TM (a mixture of 80 per cent toluene-2,4-diisocyanate and 20 per cent toluene-2,6-diisocyanate) was hydrolyzed as described herein. The polyurethane was completely hydrolyzed away from the rubber which was filtered off. The recovered polyether diol/DOP mixture was then reacted with Hylene TM to give a prepolymer. Twenty and thirty parts, respectively, of this prepolymer were blended with 80 and 70 parts, respectively, of Adiprene LD-784 (described above). These mixtures were cured with 4,4'-methylenedianiline, as was a control similarly prepared by using virgin prepolymer. The physical properties of the polyurethanes derived from polyol obtained by hydrolysis and the properties of the virgin polyurethane are compared in Table II.

The properties of the polyurethanes containing the recovered prepolymer are equivalent to and in some cases exceed those of the control.

TABLE II

| | | | Control |
|---|---|---|---|
| Adiprene LD-784 | 80 | 70 | 100 |
| Recovered Prepolymer, parts | 20 | 30 | 0 |
| $NH_2/NCO$ | 1.025 | 1.025 | 1.025 |
| Total DOP, parts | 20 | 20.6 | 20 |
| Shore A | 95 | 95 | 95 |
| R.T. Ring Tensile, psi | 4806 | 4585 | 5000 |
| % Elongation Modulus: | 527 | 550 | 550 |
| 5% | 510 | 528 | 491 |
| 50% | 1141 | 1107 | — |
| 100% | 1408 | 1386 | 1350 |
| 200% | 1781 | 1729 | 1600 |
| 300% | 2274 | 2183 | 1975 |
| 500% | 4421 | 3920 | 3875 |
| 212° F Tensile, psi | 2667 | 1927 | 2607 |
| % Elongation | 662 | 503 | 603 |
| Modulus: | | | |
| 100% | 1192 | 1146 | 1000 |
| 300% | 1463 | 1414 | 1380 |
| Crescent Tear: | | | |
| R.T. | 500 | 488 | 537 |
| 212° F | 372 | 369 | 372 |
| TexUS Flex* (Room Temp.) | | | |
| Math. Ave. | 29,750 | 25,800 | 20,750 |
| Ave. of 2 Lows | 19,000 | 18,000 | 13,000 |
| Bending Modulus, psi | | | |
| 0° C | 11,239 | 10,777 | 13,151 |
| −20° C | 14,938 | 14,370 | 16,074 |
| −40° C | 27,316 | 27,098 | 24,111 |
| −60° C | 53,115 | 49,917 | 53,580 |

*TexUS Flex-Tester Model No. 31-11 of Testing Machines, Inc. Amityville, New York.

We claim:

1. The process which comprises hydrolyzing in steam a lamination of a hydrocarbon rubber and a polyurethane derived from a polyether diol and an amine, whereby the rubber is obtained as a solid, separating the rubber by physical means from the hydrolysis reaction product containing polyether diol and amine which are produced from the polyurethane, and treating said hydrolysis reaction product with gaseous hydrogen chloride and precipitating amine hydrochloride.

2. The process of producing polyether diol from a lamination of (1) a vulcanized hydrocarbon rubber and (2) a polyurethane derived from a polyether diol and amine, which process comprises steam-hydrolyzing the lamination whereby a mixture of the hydrocarbon rubber, polyether diol and amine is formed, separating the rubber as a solid from the polyether diol and amine, diluting the diol and amine with a hydrocarbon solvent and subsequently treating the resulting solution with gaseous hydrogen chloride wherein insoluble amine salt is formed and separated by physical means from the solution, providing polyether diol which is suitable for use in the preparation of polyurethane prepolymer.

* * * * *